Dec. 27, 1966  H. W. GOFF  3,293,916
PRESSURE TRANSDUCER
Filed May 6, 1964  2 Sheets-Sheet 1

INVENTOR.
HAROLD W. GOFF
BY Brumbaugh, Free, Graves & Donohue
his ATTORNEYS

Dec. 27, 1966  H. W. GOFF  3,293,916
PRESSURE TRANSDUCER
Filed May 6, 1964  2 Sheets-Sheet 2

INVENTOR.
HAROLD W. GOFF

BY his ATTORNEYS

United States Patent Office 3,293,916
Patented Dec. 27, 1966

3,293,916
PRESSURE TRANSDUCER
Harold W. Goff, Huntington, N.Y., assignor to Instrument Systems Corporation, Westbury, N.Y., a corporation of New York
Filed May 6, 1964, Ser. No. 365,358
2 Claims. (Cl. 73—398)

The invention relates in general to pressure transducers and, more particularly, to multiple-stage pressure measuring devices designed to provide pressure sensitivity and greater accuracy over a wide range of signals.

Known types of pressure transducers used for measuring fluid pressure available heretofore suffer from a distinct disadvantage of being designed for one specific pressure range. Thus, if the pressure measuring devices were designed to record pressures at great depths below the surface of the sea, for example, it was not possible to have the same instrument give accurate readings within the range of 0 to 50 feet of sea water. In modern day subsurface technology, it is extremely important to have very accurate readings especially within the upper 50 feet of the ocean's surface and at the same time have a general but less sensitive reading of positions at much greater depths of 50 to 1600 feet, for example. The prior art devices could not adequately perform both functions.

These and other disadvantages of known pressure transducers are overcome, in accordance with the invention, by the provision of multiple sets of strain gauges, for example, arranged to consecutively measure various ranges of fluid pressures with various sensitivities, and of means for shielding the gauges of higher sensitivity from further pressure increases as the bellows approaches its range of nonlinear response.

Specifically, a multiple-stage pressure measuring device, in accordance with the invention, may include a sensitive bellows in parallel resistive alignment with a spring which transmits force at one point against a lower bending plate equipped with strain gauges. These bending plate gauges may be designed to provide a sensitive measurement of the initial partial collapse of the bellows under fluid pressures within the range of pressures experienced at sea level to those experienced at an intermediate depth of sea water, for example, 50 feet. At the pressure equivalent of a depth of 50 feet, when the bellows approaches a nonlinear range of deflection, the lower end of the spring meets a stop and thereby shields the bending plate from further pressure increases while the bellows continues to collapse.

At the depths below the intermediate depth, the fluid pressures are transmitted through the bellows to a second but less sensitive system. The pressures may, for example, be received by a movable tubular frame which may be attached around its lower circumference to a surrounding concentric, stretchable tube fitted with strain gauges adjacent its side surface. These stretchable tube gauges are designed to give accurate readings for linear deflections under fluid pressures within the range of pressures experienced at an intermediate depth of 50 feet, for example, to depths in execss of 1600 feet of sea water. Within this range of 50 to 1600 feet of seat water the bellows may collapse in a nonlinear manner until it reaches a position of total collapse. This nonlinearity, however, is immaterial since the major portion of the force resisting these higher pressures is provided by the stretchable tube and measured by its gauges. There is thus provided a device which automatically and simply varies its ranges of sensitivity and at the same time provides means for stopping the pressure exerted on a scale of higher sensitivity once it approaches an area of nonlinear measurement.

In addition, the invention relates to apparatus and methods for increasing the sensitivity of strain gauges of standard length. These results may be accomplished by mounting the strain gauge across a thin-walled, notched portion of the elongated bracket. This notched section may be approximately the same length as the strain gauge itself, but comprises only a portion, for example, one-fourth, of the elongated bracket. The elongated bracket may then be attached at its ends to the stretchable body which is deflecting under pressure. In such an embodiment, the deflection over the full length of the stretchable body will be experienced totally in the notched area in the bracket which the strain gauge is measuring. Thus standard strain gauges mounted in this manner can measure with much greater sensitivity due to the concentration of the deflection changes.

This invention also relates to a mechanical means for filtering out undesirable forces which may hamper the measurement of the true axial force which is directly proportional to the magnitude of the fluid pressure.

Other advantages will be apparent and a fuller understanding of this invention may be had by referring to the following detailed description, taken in conjunction with the following figures of the accompanying drawings, in which.

Figure 1:
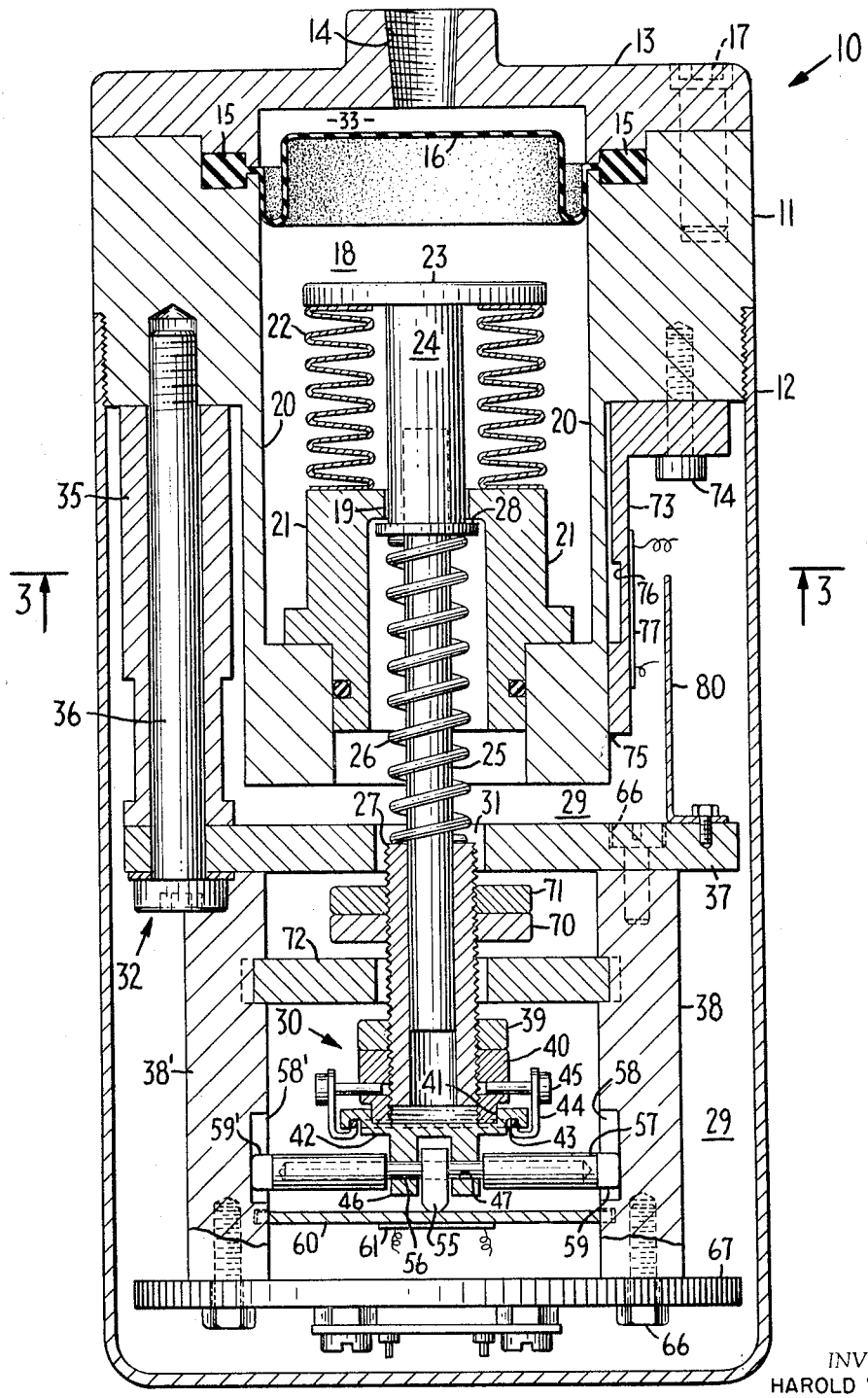
FIGURE 1 is a cross-sectional elevational view of an exemplary embodiment of a pressure transducer, taken along the lines 1—1 in FIG. 2 and looking in the direction of the arrows, in accordance with the invention.
Figure 2:
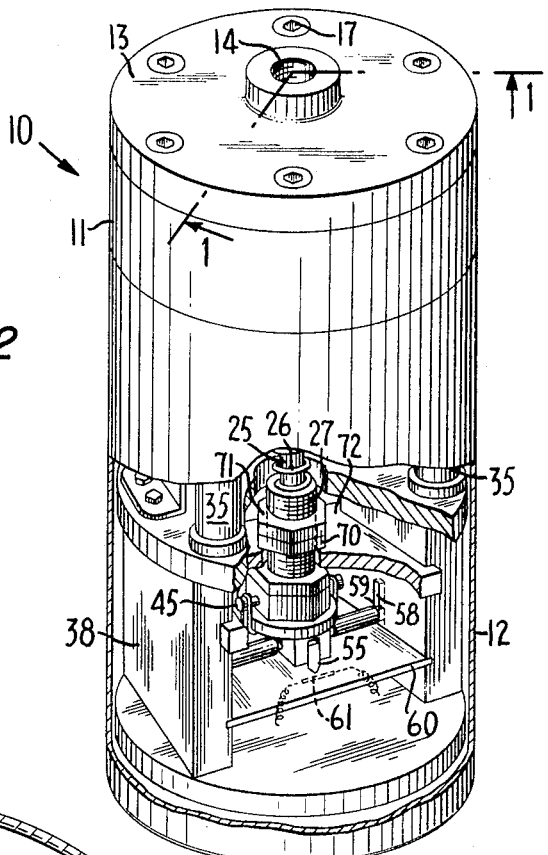
FIG. 2 is a partially broken away isometric view of the pressure transducer of FIG. 1.

With reference to the drawing, a multiple-stage pressure transducer 10 comprises a cylindrical casing, including a cylindrical frame 11, a lower cover 12 and a top covering element 13 which has an aperture 14 through its center and which is fastened to the frame 11 forming the main structural element by a plurality of fasteners 17.

A flexible diaphragm 16 having an enlarged rim 15 is placed between the cover 13 and the cylindrical frame 11, both of which jointly form a common recess for securely receiving the enlarged rim 15.

The upper cover 13 and the lower casing 12 are fastened to the cylindrical frame 11 in such a manner as to form an interior chamber, which is divided by the flexible diaphragm 16 into an upper chamber 33 and a cavity 18.

Suspended from the cylindrical frame 11 and preferably integral therewith, there is a stretchable tubular element 20 having rigid inwardly extending shoulders for supporting a movable frame 21. Mounted above the frame 21 is a cylindrical bellows 22 which supports a floating plate or piston 23 and its centrally disposed shaft 24. In the preferred embodiment, the bellows 22 acts as a metallic spring and is arranged so as to completely surround and be concentric with this central shaft 24, which passes through an aperture 19 in the movable frame 21. Shaft 24 has an enlarged lower shoulder element and washer 28, which abuts the top end of a spring 26 which, in turn, encircles an inner central shaft 25. Shaft 25 is firmly attached to and concentric with the central shaft 24 and proceeds downwardly through a recess in the movable frame 21 into a lower chamber 29 within the casing 12. The lower end of the resilient spring 26 surrounding the lower central shaft 25, abuts a tubular sleeve 27 which is mounted on the shaft 25, and is threaded on its external surface and forms the core of a force-filtering assembly 30.

In the chamber 29 and within the lower casing 12, a lower frame assembly 32 is positioned. Assembly 32 is composed of a series of four equally-spaced sleeves 35 (FIG. 3) which are held in place between an intermediate horizontal table 37 and the frame 11 by four main bolts 36. Two spaced-apart side walls 38 and 38' are fastened to, and are suspended from, the underside of the horizontal table 37. The walls 38 and 38' are fastened, in turn, to a lower horizontal frame 67 by respective fasteners 66 to form a lower, rigid, square-frame assembly into which the lower central rod 25 and the sleeve 27 enter through the aperture 31 in the horizontal plate 37.

The inner central shaft 25 terminates intermediate the ends of the sleeve 27 along which a threaded bracing nut 40 may be positioned in cooperation with a locking nut 39. The bracing nut 40 has a circular protrusion on its lower surface which fits within a circular well 41 in an upper surface of a lower brace 42, formed with two spaced lobes 46 depending perpendicularly from its lower surface with respective aligned apertures 47 passing through each lobe. A vertically disposed elongated blade 55 is positioned between the two lobes and held in place by a transverse rod 56 which passes through the blade 55 and the respective apertures 47.

A lower wedge-shaped edge of the blade 55 is designed to abut a bending plate 60 which is mounted in a horizontal position in recesses in the walls 38 and 38'. A strain gauge means 61 including one or more strain gauges of suitable conventional form is mounted on the lower surface of the bending plate 60 below the point of contact with the blade 55 and preferably in a direction perpendicular to the blade.

The upper surface brace 42 has a circular groove 43 on its lower surface, which receives a circular spring link 44, having two spring loops for attachment to a pair of pins 45 mounted in respective lateral holes in the bracing nut 40. In this manner, the lower brace 42 is held with spring force against the bracing nut 40.

The two ends of the transverse rod 56 are held in a pair of sleeves 57 and 57', the respective ends 59 and 59' of which are keyed to slide in respective vertical slots 58 and 58' on the inner surfaces of the lower frame walls 38 and 38'.

The bracing nut 40 and the locking nut 39 may be moved up or down the threads on the external surface of the sleeve 27 in order to permit the adjustment of the initial or low pressure bearing through the shaft 24 and the blade 55 against the bending plate 60.

Above the lower filtering assembly 30, a horizontal blocking plate 72 is held in a fixed position by respective slots in the vertical bracing walls 38 and 38'. The blocking plate 72 has an aperture in its center through which the threaded sleeve 27 freely passes. Above the plate 72 locking means including two locking nuts 71 and 70 are threaded on the externally threaded sleeve 27 and may be positionally adjusted along its length. As sleeve 27 moves downwardly, the lower nut 70 is adapted to come into contact with the blocking plate 72 thereby fixing the lower limit of movement of the sleeve 27.

Above the lower frame assembly 32 and the force-filtering assembly 30, but still within the chamber 29, a plurality of expandable brackets 73 are fixed adjacent the walls of the stretchable tube 20. Each of these brackets is attached to one end of the cylindrical frame 11 by suitable fasteners 74 at a point where the suspended stretchable tube 20 is attached to, or joins, the main portion of the cylindrical frame 11. The other end of each of the expandable brackets 73 is attached firmly to the lower end of the stretchable tube 20 by a weld 75, the bracket 73 being as long as the walls of the stretchable tube but having a notched area 76 which is, in the embodiment shown, approximately one-fourth the length of the bracket.

Figure 3:
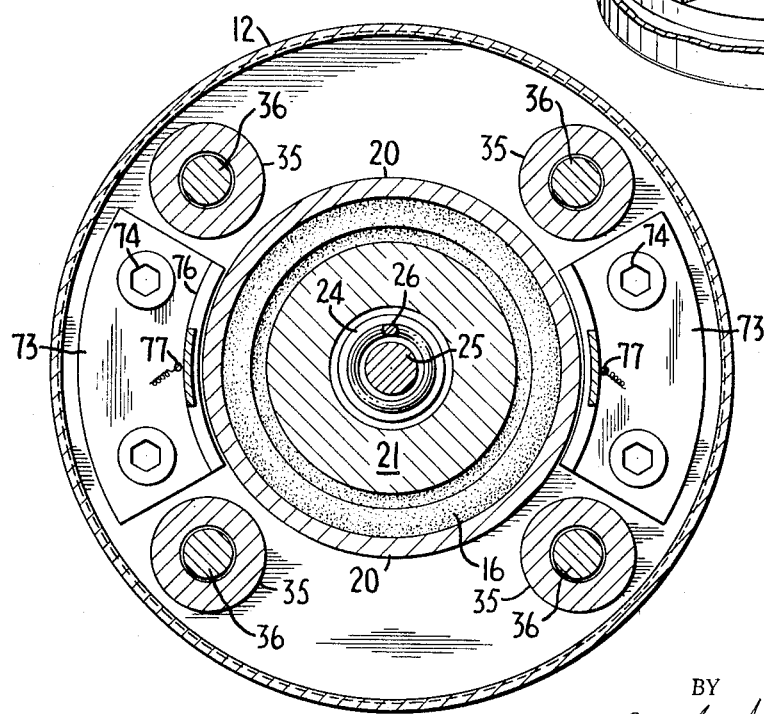
FIG. 3 is a cross-sectional view of the pressure transducer taken along the lines 3—3 in FIG. 1 and looking in the direction of the arrows.

The notch 76, shown in detail in FIG. 3, is C-shaped and cuts into its respective bracket 73 from three sides, i.e., its inner surface and its two ends. Thus, in the region of the notch 76, the bracket has a much reduced cross-sectional area. Across each of the expandable brackets 73, in the area of the notch 76, one or more strain gauges 77 is placed for determining the deflection at this point. These gauges are, in turn, protected by shield 80.

In operation, this embodiment of the pressure transducer is designed to measure accurately wide ranges of pressure readings by employing a plurality of scales of varying sensitivity. Specifically, the fluid to be measured enters through the aperture 14 into the upper chamber 33 and exerts a pressure against the flexible diaphragm 16. Since, in this particular exemplary embodiment, the pressure transducer is designed to operate in salt water, a non-corrosive fluid of similar density may be placed in the cavity 18. The fluid in the cavity 18 will exert the same pressure as the sea water against the floating plate 23, which will tend to collapse the spring-like, resistive bellows 22 and move the centrally disposed shaft 24 downwardly until the upward forces exerted by the bellows 22 and the spring-biased shaft 24 equalize the force resulting from the increase in pressure on the upshoulder element 28 move downwardly, it exerts a downward force on the spring 26 which yields according to its spring constant and exerts a related downward force against the tubular sleeve 27. The sleeve 27, in turn, exerts a downward force on the bracing nut 40 which forces the lower brace 42, the lobes 46, the transverse rod 56, and the blade 55 downwardly in that order. Finally, the bending plate 60 begins to yield, deflecting under the influence of the blade 55. The bending of the plate 60 causes the length of the strain gauge means 61 to increase thereby changing the electrical signal passing therethrough. The force of the sea water entering apertures 14 is correlated with the electrical readings in the strain gauge means 61 so that appropriate indicating or recording means (not shown) can be correctly calibrated. The indicating or recording means may be, for example, a standard meter responsive to such electrical signals. Furthermore, the signals in this system may be either A.C. or D.C.

As mentioned earlier, the bracing nut 40 and the locking nut 39 may be adjusted upwardly or downwardly along the external threads of the sleeve 27 to adjust the zero or sea level pressure setting. In other words, at sea level a certain downward force will be experienced by the floating plate 23 which will be resisted in part by the bellows 22 and in part by the spring-biased shaft 24 which is indirectly supported by the bending plate 60, as shown in FIG. 1. By moving the bracing nut 40 up along the threads of the sleeve 27 more of the force resisting the downward movement of plate 23 is shifted to the bellows 22 and away from the bending plate 60. If desired, a point may be reached where there is zero pressure exerted on the bending plate 60 and the entire resistive force is exerted by the bellows 22. At this point, the reading of the strain gauge means 61 attached to bending plate 60 would be calibrated as zero depth or one atomsphere.

Since the spring constant of the spring 26 and the tolerances of the other elements within each individual pressure transducer will cause a zero adjustment to occur at a slightly different place along the externally threaded surface of each sleeve 27, the filtering assembly 30, by means of the adjustment of the bracing nut 40, facilitates the necessary individual adjustment of the pressure on each bending plate 60.

Zero depth does not have to be correlated with zero pressure on plate 60 but may be correlated with any pressure setting desired. Furthermore, the chamber 29 may be evacuated in order to prevent changes in volume of the structural elements in response to temperature changes.

In addition to providing an adjustable feature for calibration, the filtering assembly 30 assures that only an axial force will be delivered by the blade 55 against the bending plate 60. To permit adjustment, the lower circular protrusion of the bracing nut 40 is free to rotate about the longitudinal axis of the shaft 25 and the sleeve 27 within the circular groove or well 41 on the upper surface of the lower brace 42 without movement of the brace 42 and connected lower elements. This arrangement protects the lower elements from the possibility of damage. To prevent disproportionate point contact between the blade 55 and the bending plate 60 and to prevent distorted bending thereof, the blade 55 is pivoted about the axis of the rod 56 in such a way that the full longitudinal edge of the blade will be in contact with the bending plate 60 before any deflection is detected by the strain gauge means 61. The rod 56 and the sleeves 57 provide the further function of centering the movable assembly attached to shaft 25. The uniform bending of the plate 60 in response to the pressure of centrally positioned blade 55, is thus assured.

As stated above, the increase in fluid pressure acting against the upper surface on the floating plate 23 causes the partial collapse of the bellows 22 and the downward movement of the shaft 24. Assuming that the force-filtering assembly 30 has been adjusted to a zero setting, the bending plate 60 will first deflect under the force exerted by the blade 55 when the pressure transducer moves below sea level and fluid enters the chamber 33 at a pressure above one atmosphere, acting against the diaphragm 16 and the floating plate 23. Although the collapse of the bellows 22 will cause much of the downward forces to be exerted against the bending plate 60, a portion of the resistive force, even in these early stages of low fluid pressures, will be absorbed by a slight strain or deflection experienced in the stretchable tube 20. The resistive strength or rate of collapse of the bellows 22 and the spring 26 will determine the proportion of resistive force contributed by the bending plate 60 and tube 20. This, however, will not affect the accuracy of the highly sensitive bending plate strain gauge means 61, both the bellows 22 and the spring 26 are operating in ranges of linear response prior to shielding of the bending plate.

It should be emphasized that the bending plate 60 is preferably highly sensitive to even slight pressure increases and will yield quickly under rapid pressure increases, thereby causing a corresponding rapid change in the strain gauge means 61 attached thereto.

In the preferred embodiment described herein, the strain gauge means 61 gives linear responses for linear increases in deflection experienced by the bending plate 60 under pressures up to approximately those experienced at a depth of 50 feet of sea water, for example, by having such a relatively short measuring range of fluid pressures the strain gauge means 61 attached to the bending plate 60 is able to provide great sensitivity and accurate depth indications in depths up to, say, 50 or 75 feet. This provision is highly important to the operation of a submarine or vessel in shore or coastal areas which require delicate and accurate depth information.

The locking means 70 and 71 serve to protect the strain gauge means 61 from damage at much greater depths and also in order to prevent the transmission of nonlinear signals from the bellows 22 to the strain gauge means 61. At the cut-off point desired, the nut 70 is positioned so that it abuts the blocking plate 72 preventing further downward movement of sleeve 27 and stopping further bending of the plate 60.

Further pressure increases at depths below the intermediate cut-off depth will continue to increase the pressure on the upper surface of the floating plate 23. These further pressure increases will continue to be resisted by the spring 26 and by the bellows 22, as they both gradually yield with each slight increase. These increases in pressure on the floating plate 23 continue to be transmitted by the bellows 22 both before and after it collapses, to movable frame 21, and, in turn, to the inner rim of the stretchable tube 20.

As explained above, the expandable bracket 73, shaped in the form of an arc as shown in FIG. 3, is firmly attached to the cylindrical frame 11 and to the lower end of the stretchable tube 20, and is positioned so that it will yield with the stretchable tube 20 in response to further pressure increases. However, since the expandable bracket 73 is notched and cut away so that only a small portion, approximately one-sixth in the embodiment shown, of its normal cross-sectioned area is present at the notch 76, the deflection corresponding to the deflection of the entire length of stretchable tube 20 is concentrated within the relatively short length of the notch 76. In the preferred embodiment, the stretchable tube 20, the deflection of which is being measured, and the full length of bracket 73 are both approximately four times as long as the notch 76. Thus, the deflection for the full length of the expandable bracket 73 is experienced in the notched area 76 which is only one-fourth of its length.

Even though this arrangement multiplies the deflection experienced by the strain gauges 77 attached to the bracket 73 across the notch 76, the total deflection for relatively slight increases in pressure is still very small and the corresponding changes in the reading from the strain gauges 77, are necessarily small. Thus, although the sensitivity of gauges 77 is increased, a gauge of relatively low sensitivity and high strength is still provided which can measure fluid pressure at depths in excess of 1000 or 2000 feet of sea water depending upon the dimensions of the stretchable tube 20, the dimensions of the notch 76, and, of course, depending upon the depths at which measurement is desired.

The change in deflection per change in pressure measured by the strain gauges 77 is much less than the changes in deflection measured by the gauge means 61 for a corresponding change in pressure. Thus, the precision of the measurement provided by the strain gauges 77 is much less than the precision provided by the strain gauge means 61, although slight inaccuracies in depth of just a few feet at an overall depth of 1500 feet would normally be of relatively small significance.

While a detailed description has been given of an exemplary two-stage system with one low range, pressure sensitive strain gauge measuring unit and one high range unit, other embodiments are contemplated having multiple-stage pressure transducers with more than two pressure measuring units. For example, using the same techniques disclosed herein, a triple-stage or quadruple-stage measuring device could easily be designed if it were necessary to provide highly accurate readings over a very wide range. In such an arrangement, as in the two-stage arrangement disclosed above, each measuring unit would be taken over its linear range of measurements successively. In the device disclosed herein, the measuring units are not strictly successive, but are cumulative over successively wider ranges, i.e., all gauges are measuring strain from the initial pressures although the ranges of measurement of the more sensitive gauges are shorter. However, other arrangements of strain gauges are contemplated, in accordance with the invention wherein each set of gauges in a multiple system begins measuring strain at the point where that particular set becomes the critical measuring unit. Such an alternate system, not shown here, has the advantage of fully utilizing the linear response range of each set of gauges.

Although in the preferred embodiment an intermediate depth of 50 feet of sea water has been mentioned, various embodiments are envisioned which would have an intermediate cut-off depth of any desired value, say, 100 feet or 200 feet of sea water if accurate measurements of depth at these levels are needed.

If greater accuracy for a relatively short range at a greater depth is desired, highly sensitive gauges may be placed, in accordance with the invention, in successive alignment so as to utilize successively their respective ranges of linear response in the above described manner.

Furthermore, other embodiments are contemplated wherein the walls of the bellows 22, as shown in FIG. 1, are composed of a totally collapsible material such as rubber rather than the pressure resistive, metal, spring-like bellows described in the preferred embodiment. In this alternative arrangement, all of the initial pressure increases would be resisted only by bending plate 60.

Thus there is provided, in accordance with the invention, novel methods and apparatus having the capacity for measuring great depths combined with a means for obtaining highly accurate and sensitive readings at near-surface locations or within other short ranges of pressure differential at greater depths. Furthermore, while the specific embodiment disclosed herein calls for a notched, expandable bracket where the notch is one-fourth of the length of the expandable bracket, other embodiments are contemplated where this ratio will be either greater or smaller depending upon the sensitivity of measurement desired.

It will be obvious to those skilled in the art that the above-described embodiment is meant to be merely exemplary and that it is susceptible of modification and variation without departing from the spirit and scope of the invention. Therefore, the invention is not deemed to be limited except as defined by the appended claims.

I claim:

1. A multiple-stage pressure transducer, comprising
   a casing forming a chamber having an aperture at one end through which fluid may pass,
   a flexible diaphragm within said chamber covering said aperture,
   a movable shaft within said chamber having a platform attached at one end,
   a bellows surrounding said shaft and yieldably supporting said platform and said movable shaft, but only in part, when said pressure transducer is below sea level,
   a stretchable tape suspended from said casing surrounding and supporting said bellows,
   a bending plate supported by said casing and supporting, in part, said movable shaft when said pressure transducer is below sea level,
   filtering means disposed between said movable shaft and said bending plate for transmitting only axial movement of said movable shaft to said bending plate, said filtering means being adjustable to a zero pressure setting on said bending plate,
   at least one strain gauge attached to said bending plate for measuring the deflection of said sensitive bending plate,
   means for locking said filtering means in a lowest position thereby shielding said bending plate from further pressure increases,
   resilient means disposed between said movable shaft and said filtering means permitting the further descent of said movable shaft once said filtering means has been locked in position, and
   at least one strain gauge attached to said stretchable tube for measuring the magnitude of the deflection of said tube over a wide range of fluid pressures.

2. A multiple-stage pressure transducer as described in claim 1, comprising means for indicating the readings of a strain gauge attached to said sensitive bending plate and for subsequently indicating the readings of said strain gauge attached to said stretchable tube when said filtering means has been locked in position.

References Cited by the Examiner

UNITED STATES PATENTS

| | | | |
|---|---|---|---|
| 1,894,648 | 1/1933 | Wahl | 73—397 |
| 2,421,222 | 5/1947 | Schaevitz | 73—141 |
| 2,487,595 | 11/1949 | Ruge | 73—88.5 |
| 2,582,886 | 1/1952 | Ruge | 73—141 |
| 2,867,115 | 1/1959 | Statham | 73—398 |
| 2,927,458 | 3/1960 | Moon et al. | 73—141 |
| 3,120,754 | 2/1964 | Lebow | 177—211 X |

LOUIS R. PRINCE, *Primary Examiner.*

D. O. WOODIEL, *Assistant Examiner.*